United States Patent [19]

Rensch et al.

[11] Patent Number: 4,884,499
[45] Date of Patent: Dec. 5, 1989

[54] PORTABLE GRILL

[76] Inventors: Eugene F. Rensch, Box 21, Makoti, N. Dak. 58756; Michael E. Rensch, Box 963, New Town, N. Dak. 58763

[21] Appl. No.: 185,457

[22] Filed: Apr. 25, 1988

[51] Int. Cl.⁴ .............................................. A47J 37/07
[52] U.S. Cl. .................................... 99/449; 126/9 R; 99/450
[58] Field of Search ................ 99/449, 450, 424, 340, 99/390, 391, 402, 339, 393, 400, 421 R, 421 H, 421 HH, 421 HV; 126/29, 25 R, 9 R; 248/439, 166

[56] References Cited

U.S. PATENT DOCUMENTS

| | | |
|---|---|---|
| 1,656,181 | 1/1928 | Elbert . |
| 1,796,033 | 3/1931 | Lee . |
| 2,048,769 | 7/1936 | Anderson . |
| 2,441,190 | 5/1948 | Fuller . |
| 2,552,861 | 5/1951 | Overman . |
| 2,573,988 | 11/1951 | Saltzberg . |
| 2,619,951 | 12/1952 | Kahn . |
| 2,679,243 | 5/1954 | Lee . |
| 2,774,345 | 12/1956 | Peplin . |
| 2,862,777 | 12/1958 | Paige .................................... 126/9 R |
| 2,893,373 | 7/1959 | Rundle . |
| 2,946,275 | 7/1960 | Compton . |
| 2,962,019 | 11/1960 | Lundgren . |
| 3,182,585 | 5/1965 | Rensch et al. . |
| 3,363,543 | 1/1968 | Roberts et al. . |
| 3,421,433 | 1/1969 | Vitale . |
| 3,566,856 | 3/1971 | Linstead ........................... 248/439 X |
| 3,610,225 | 10/1971 | Schwantes ........................ 126/25 R |
| 3,611,912 | 10/1971 | Choc . |
| 3,673,948 | 7/1972 | Albright ............................ 99/393 X |
| 3,692,013 | 9/1972 | Grafton et al. ................ 126/25 R X |
| 4,120,237 | 10/1978 | Mecherlen . |
| 4,135,691 | 1/1979 | Wiesmann ........................ 248/439 X |

FOREIGN PATENT DOCUMENTS 231482 6/1959 Australia .
484518 of 1917 France .

Primary Examiner—Harvey C. Hornsby
Assistant Examiner—K. O'Leary
Attorney, Agent, or Firm—Kinney & Lange

[57] ABSTRACT

In order to more easily handle a portable grill, fuel pans which can be supported in either horizontal position or vertical position are provided with removable grates which will confine charcoal briquettes within the fuel pan whether it is horizontal or vertical. The grate is slidable into and out of the "down" end of the fuel pan when vertical and, when installed, the grate does not extend to the "up" end of the fuel pan thus to provide space where fresh briquettes can be added. U-shape legs which snap into and hold an operable condition supporting the grill off the ground and which snap into a stowed condition parallel with the rest of the grill when the grill is not in use are provided. A stop is provided to assist in holding the fuel pan in its upright position while it is being clamped in place.

14 Claims, 3 Drawing Sheets

PORTABLE GRILL

BACKGROUND OF THE INVENTION

1. Field of the Invention.

This invention has relation to improvements to a portable grill which was disclosed in U.S. Pat. No. 3,182,585 issued to Rensch et al on May 11, 1965. The improvements relate to making the portable grill easier to shut down, empty, clean, pack away and otherwise handle.

2. Description of the Prior Art.

The closest prior art to the present invention is, of course, the above cited U.S. Pat. No. 3,182,585. Ten patents were cited against this patent. They are U.S. Pat. Nos. 1,656,181 issued to Elbert in January of 1928; 1,796,033 issued to Lee in March of 1931; 2,441,190 issued to Fuller in May of 1948; 2,552,861 issued to Overman in May of 1951; 2,573,988 issued to Saltzberg in November of 1951; 2,679,243 issued to Lee in May of 1954; 2,893,373 issued to Rundle in July of 1959; 2,946,275 issued to Compton in July of 1960; Australian Patent 231,482 issued in December of 1960; and French Patent 484,518 issued in July of 1917.

SUMMARY OF THE INVENTION

A portable grill of the prior art included a generally rectangular main frame, at least one generally rectangular open top fuel pan having a bottom wall, a pair of mutually parallel side walls and mutually parallel first and second end walls, the side walls and end walls connecting to each other and extending integrally upwardly from the bottom wall. The pan is adjustably mounted with respect to the main frame of the grill to be movable and pivotable about a fuel pan axis adjacent the first pan end wall. A grate covers a substantial portion of the open top of the fuel pan from the first pan end wall toward but short of the second pan end wall thus to leave a fuel access opening between the grate and the second pan end wall. The grate had slots on its sides which cooperated with lips on the fuel pan to releasably attach the gate to the fuel pan. The grate was difficult to remove when the slot filled with dust or the grate or fuel pan warped.

The improvement to this structure includes furnishing the fuel pan with a lip extending integrally inwardly from at least the side walls and the first end wall. This lip defines a first fuel pan plane. An easily installed and removable grate includes a foraminous rectangular framework lying in a single plane. First and second grate positioning bars extend integrally outwardly from opposed side edges of this grate framework, but lie outside of the plane of the grate. The positioning bars are of a configuration and dimension so that both of them extend over and in contact with both lip side edge wall portions to position the upper surface of the grate framework in the first fuel pan plane when the grate is attached to the fuel pan. A first grate retaining means extends integrally outwardly and downwardly from a first end portion of the grate framework so that it can slide under a first end wall portion of the lip to tend to retain the grate framework in the fuel pan plane when the grate is attached to the fuel pan.

In addition to the first and second grate positioning bars and the first grate retaining means, a grate retaining bar is integral with a second end portion of the grate framework and is attached to the underside of that framework and is of configuration and dimension to extend under and beyond both lip side edge wall portions to thus, cooperating with the first grate retaining means and the first and second grate positioning bars, retain the grate framework in the first fuel pan plane when the grate is attached to the pan.

To move the grate from the pan, it is only necessary to slide the grate to bring the first grate retaining means into clearing relation to the lip. Then by lifting on the grate and twisting it slightly, the grate retaining bar will come out from under the lip.

The generally U-shape frame support means of the prior art have been modified to provide for support means pivot brackets extending integrally downwardly from each of the four corners of the main frame. These pivot brackets now including a skirt configured to contact and closely encompass legs of the support means adjacent to pivot pins on the free end of the legs. These pivot pins are pivoted in the pivot brackets. The first part of each such skirt extends around a first side of its associated leg to limit movement of the leg from stowed to operable condition to prevent it from going past its operable condition, a second part of the skirt extending around a second opposite side of the leg tends to releasably retain the leg in either the operable condition or the stowed condition. This skirt second part includes a cam which has first and second camming surfaces. The first camming surface extends from substantially tangent to the leg in the plane of leg movement about its pivot pin when in operable condition to a high point forcing the leg to move in direction away from its pivot bracket.

The second camming surface of the second part of the pivot bracket skirt extends from the high point of the first camming surface to tangent relation to its associated leg in the stowed condition in the plane of leg movement about the pivot pin axis.

BRIEF DESCRIPTION OF THE DRAWINGS

FIG. 2 is an enlarged sectional view taken on the line 2—2 in FIG. 1;

DETAILED DESCRIPTION OF THE PREFERRED EMBODIMENTS

Figure 1:
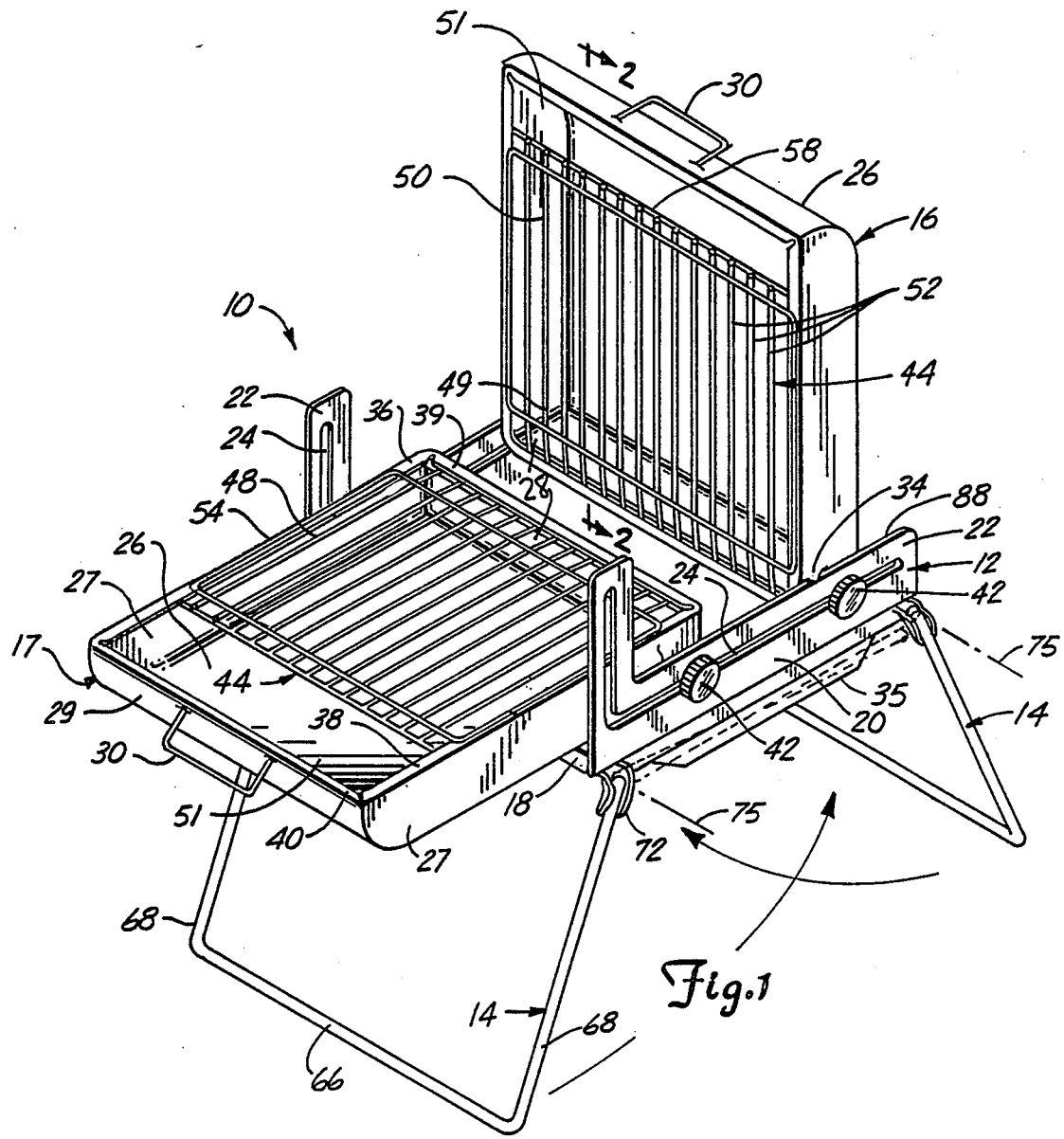
FIG. 1 is a perspective view of a portable grill made according to the invention.
Figure 3:
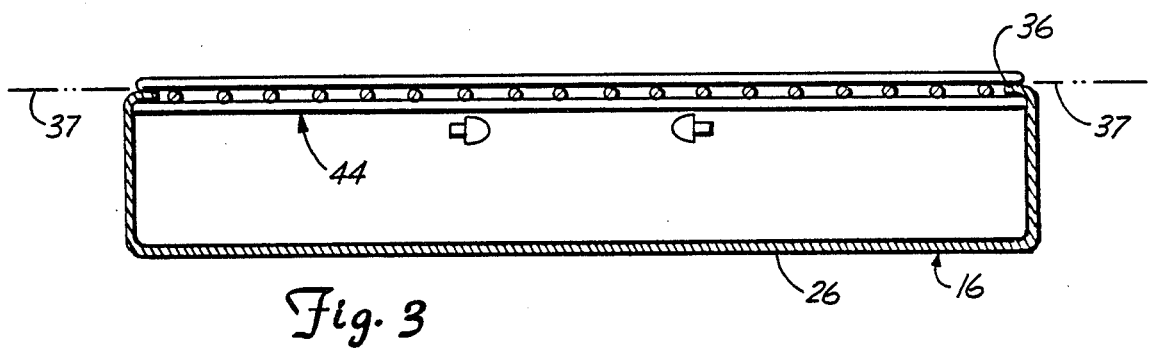
FIG. 3 is a sectional view taken on the line 3—3 in FIG. 2.

A portable grill 10 includes a main frame 12 which is horizontally disposed when in operable condition, a pair of generally U-shape frame support means or leg means 14,14, and first and second generally rectangular, open top fuel pans 16 and 17.

This invention is an improvement on the PORTABLE GRILL shown in U.S. Pat. No. 3,182,585 issued on May 11, 1965 to Joseph T. Rensch and Eugene F.

Rensch (hereinafter "the '585 patent"). That patent is incorporated into this specification by this reference to it.

The improved portable grill of the present invention can be used with either or both of the fuel pans in vertical position as first fuel pan 16 is illustrated, or in horizontal position as second fuel pan 17 is illustrated.

Main frame 12 includes a pair of spaced-apart, elongate, frame end members 18,18 joined at right angles to a pair of spaced-apart, elongate frame side members 20,20. Slotted vertical side plates 22,22 extend integrally upwardly from outer edges of the frame side members 20,20, and each plate 22 is provided with an L-shape fuel pan positioning slot 24,24.

As in the case of the portable grill of U.S. Pat. No. '585, a so-called combination heat shield pan, storage compartment pan and drip pan 35 is removably mounted to slide into and out of flanges located at edges of the underside of main frame 12. This structure forms no part of the present invention per se.

Each of the fuel pans 16 and 17 includes a bottom wall 26, a pair of mutually parallel side walls 27,27, and first and second end walls 28 and 29, respectively. Second end wall 29 is provided with a handle 30. Threaded stud bolts 32 on a common fuel pan pivot axis extend integrally outwardly from each of the fuel pan side walls 27 in position adjacent but spaced slightly from bottom wall 26 and first end wall 28. Fuel pan alignment stops 34 extend outwardly from each of these fuel pan side walls 27 for a purpose to be later described.

A lip 36 extends inwardly from the top edge of the side walls 27,27 and end walls 28,29 of each fuel pan 24, and these top edges and lip define a first plane. For ease of description, this plane will be considered as the fuel pan first horizontal plane 37 of the second fuel pan 17 as seen in FIG. 1. The lip can be considered to include lip side wall portions 38,38, lip first end wall portion 39 and lip second end wall portion 40.

The diameter of the threaded stud bolts 32 will be such that each fuel pan, 16 or 17, can be fitted between the slotted slide plates 22,22 with the stud bolts on each side of the fuel pan sliding easily in the slots 24. Clamping nuts 42, threaded to receive the stud bolts 32, are initially threaded loosely on those bolts once the pans 16 and 17 are assembled to the main frame side plates 22,22. Then when the fuel pans are brought into operational position where they are to be filled with solid fuel such as charcoal briquettes or the like and ignited, the clamping nuts 42 can be tightened up to force the side walls 27 of the fuel pans tightly against the side plates 22 of the main frame to fix the fuel pans temporarily in such operational positions. The clamping nuts 42, as shown, have a wide base the width of the knurled nut, and this base comes in contact with the frame side plate 22 to give a good clamping action. However, the wing nuts and washer 61 disclosed in the Rensch et al patent, U.S. Pat. No. '585, will also serve as effective clamping nuts.

Grate 44, in the form of the invention as shown, includes a foraminous, generally rectangular framework of relatively closely spaced bars 46. The grate of the present invention can be thought of as having two side edge portions 48,48 and first and second end edge portions 49 and 50. The entire rectangular framework including these edge portions lies in a single plane. Although similar grates could be constructed with expanded metal screening, the grate 44 in the form of the invention as shown includes a plurality of closely spaced, mutually parallel, grate framework bars 52.

First and second grate positioning bars 54,54 extend integrally from the opposed side edge portions 48,48 of the framework 46 of the grate, these positioning bars being of configuration and dimension to extend over and in contact with both lip side wall portions 38,38 of the fuel pans to position the upper surface of the grate framework 46 in the first fuel pan plane when the grates are assembled to the fuel pans.

First grate retaining means 56 extends integrally outwardly from the first end portion 49 of the grate framework 46 and is of configuration and dimension to extend under and in contact with the lip first end wall portion 39 to tend to retain the upper surface of the grate framework in said first plane when the grate is attached to the fuel pan. A second grate retaining mechanism such as grate retaining bar 58 is integral with the second end edge portion 50 of the grate framework and that retaining bar 58 is of configuration and dimension to extend under and beyond both lip side wall portions 38,38 to retain the grate framework 46 in the first plane when the first grate retaining means 56 is under and in contact with the lip first end wall portion 39.

Figure 4:
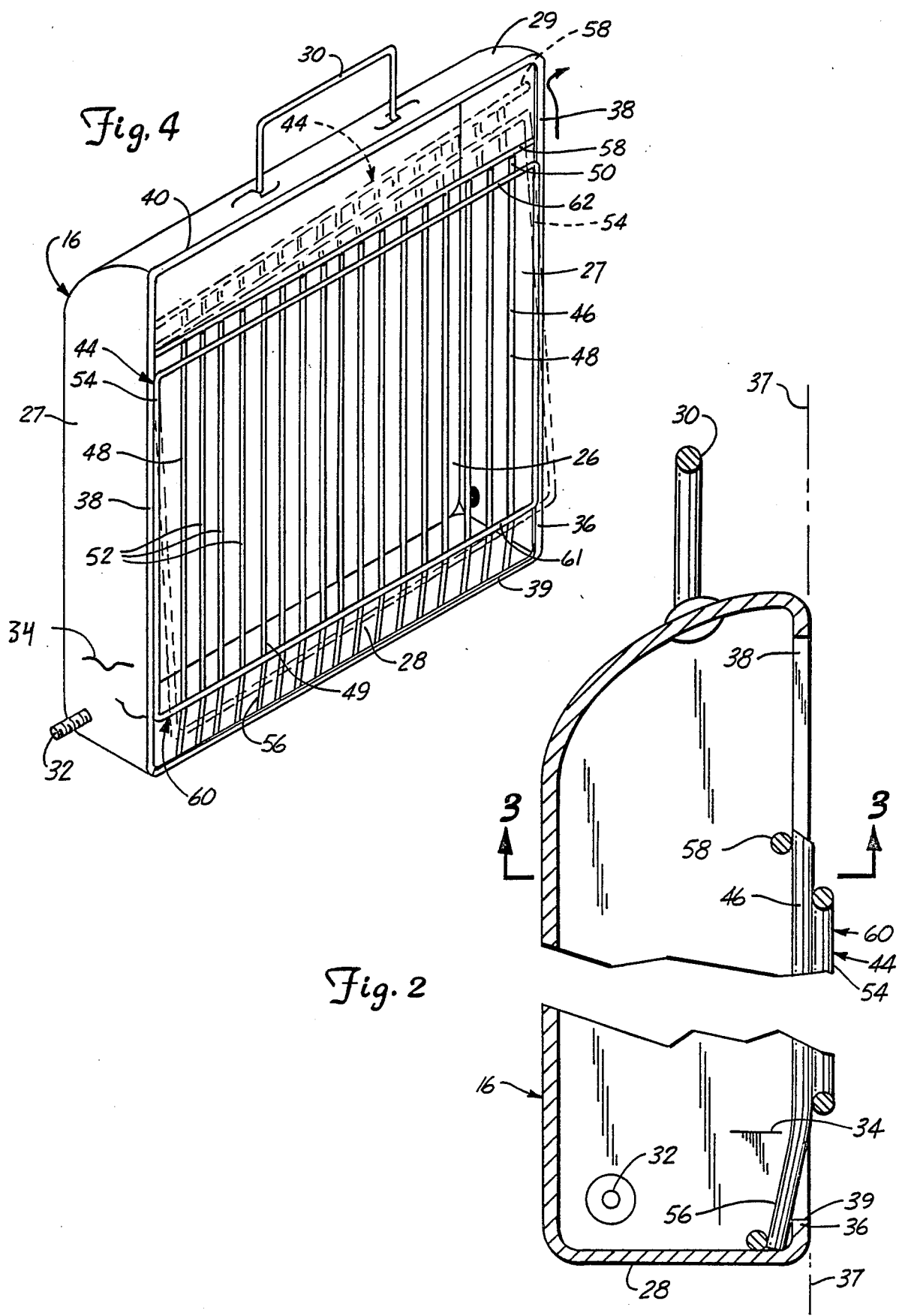
FIG. 4 is a perspective view of a fuel pan forming part of the grill of the invention as seen in FIGS. 1, 2 and 3 and illustrating the manner of installing and attaching a grate to the fuel pan.

To install the grate retaining bar 58 under lip side wall portions 38,38, the grate 44 is placed against the lip side wall portions 38,38 at an angle such that the ends of bar 58 can pass between these lip portions. This position is shown in dotted lines in FIG. 4. The grate can then be straightened with the first grate retaining means 56 clear of lip first end wall portion 39. The grate is then moved to slide means 56 under lip portion 39. At this point, the grate 44 is attached to the pan 16 or 17 and cannot escape from it as long as the grate moves from horizontal position to a vertical position with the pan first end wall 28 at the bottom.

Specifically, the first and second grate positioning bars 54,54 are mutually parallel and are parts of a rectangular grate frame 60. The grate frame 60 also includes first and second mutually parallel framework holding bars 61 and 62, respectively. Outer ends of each of the holding bars 61 and 62 are integrally connected to outer ends of each of the grate positioning bars 54,54.

The grate framework 46, in the form of the invention as shown, includes a plurality of relatively closely spaced, mutually parallel, grate framework bars 52 each extending in parallel relation to the grate positioning bars 54,54, each such grate framework bar being integrally attached, as by welding for example, to each of the grate framework holding bars 61 and 62 to position the holding bars outside of the first fuel pan plane 37.

The first grate retaining means 56, in the form of the invention as shown, includes an extension of the grate framework bars 52 beyond the first end edge portion 49 of the grate framework and its adjacent first grate framework holding bar 61. The extension of the grate framework bars 52 reaches outwardly and downwardly of the plane of the grate framework 46 to have configuration and dimension such that at least an outermost end portion of such extension lies under and in contact with the lip first end wall portion 39 to tend to retain the upper surface of grate framework 46 in the first horizontal fuel pan plane 37.

While its design permits grates 44 to be securely positioned on fuel pans 16 and 17, they can also be easily attached to and removed from the fuel pans. Problems associated with fuel pan and/or grate warpage and dust buildup in the prior art designs are thereby alleviated. The use of grate 44 in conjunction with fuel pans 16 and 17 therefore facilitates the ease and convenience of using grill 10.

The U-shape frame support means or leg means 14,14 are each identical to the other. A description of one, therefore, will suffice. Support means 14 includes a base 66, two legs 68,68 extending integrally away from the base at approximately right angles to it, the legs lying in the same plane. A pivot pin 70 extends integrally away from the outer free end of each leg 68, the pivot axis of these pivot pins being coincident. In the form of the invention as shown, the base 66, legs 68,68, and pivot pins 70,70 of each frame support member 14 are made from a single cylindrical rod of uniform diameter.

A support means pivot bracket 72 extends integrally from each of the four corners of the grill main frame 12, each bracket being provided with a pivot pin support opening 74 therethrough of diameter to easily encompass a pivot pin 70.

Each pair of pivot pin support openings 74,74 are mutually aligned to define a single, coincident pivot pin support axis 75. Each of these two axes 75 are parallel to the other.

Figure 5:
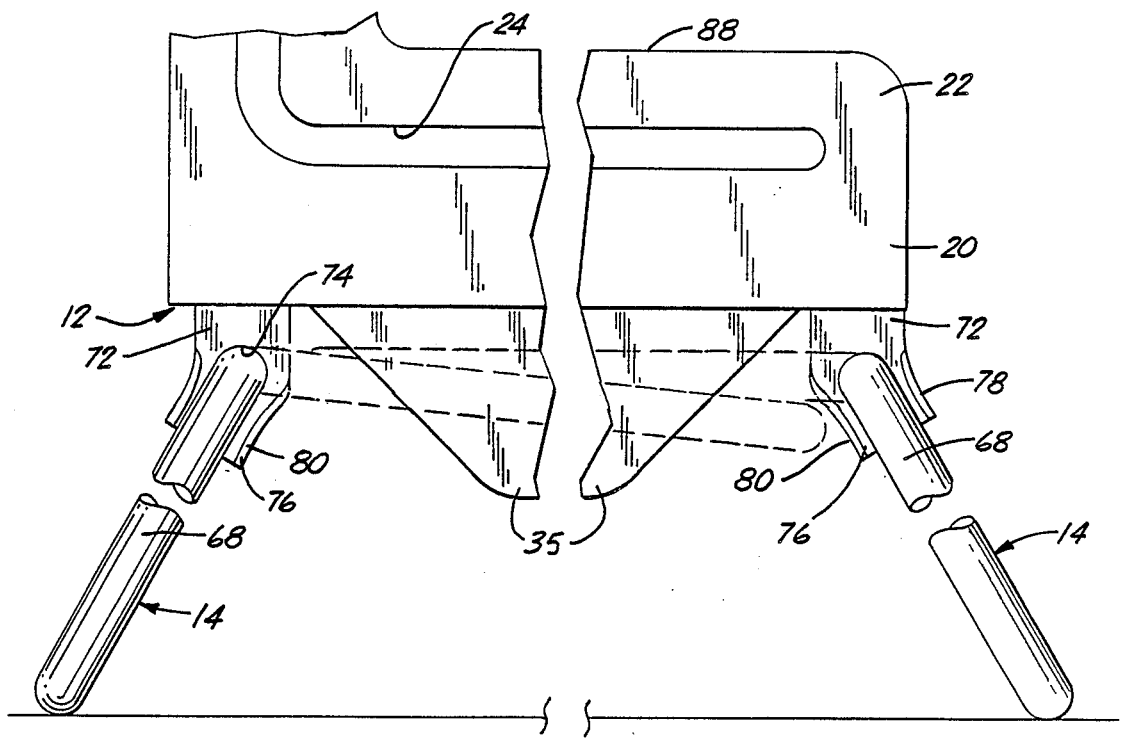
FIG. 5 is a fragmentary side elevational view of the main frame, frame support means including legs, and slotted vertical side plates of the grill of the invention with the fuel pans removed therefrom.
Figure 6:
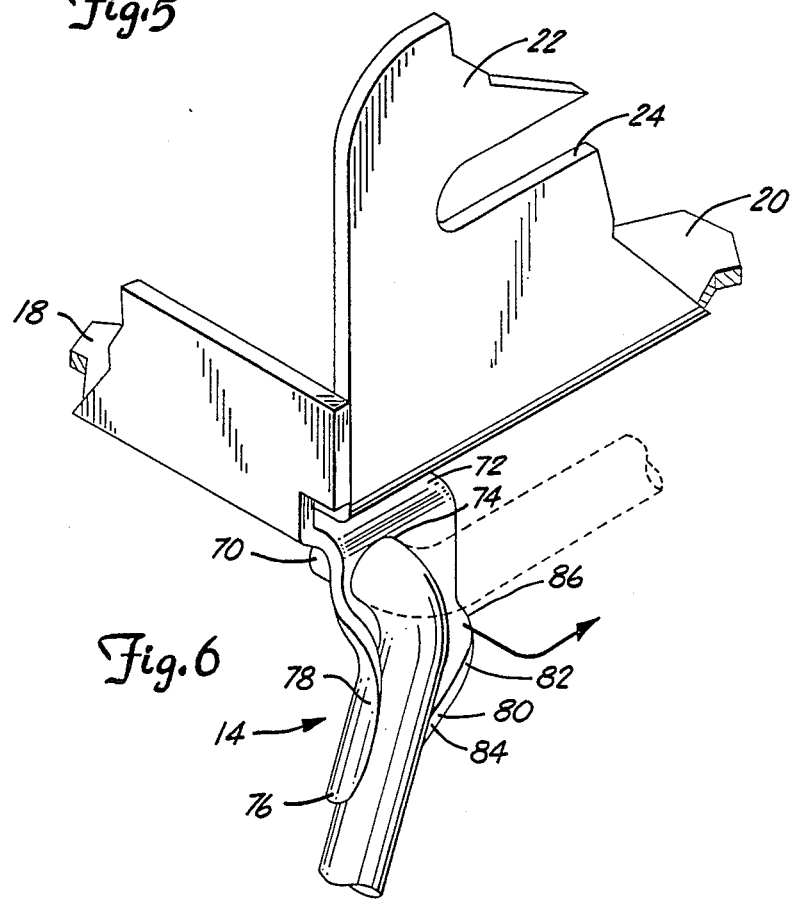
FIG. 6 is an enlarged, fragmentary, perspective view of the main frame, a side plate and the frame support means as seen from above and to the right of the rear corner of the main frame as seen in FIG. 5.

As seen in FIGS. 1, 5 and 6, each pivot pin 70 is mounted in one of the pivot brackets 72. The base 66 and the legs 68,68 are sufficiently resilient, and the configuration of these elements is such that the free ends of the legs have to be sprung apart in order to assemble the pivot pins to the pivot brackets, and this resilience continually biases the legs 68 to tend to hold the pivot pins 70 firmly into the pivot pin support openings 74.

Each pivot bracket includes a U-shaped channel member or skirt 76 extending downwardly from adjacent the support opening 74, the skirt being configured to contact and closely encompass the upper part of the leg 68 when the support means is in its operable condition as seen in full lines in FIGS. 1, 5 and 6. A first part 78 of the skirt 76 extends around a first side of the upper end of leg 68 to limit the movement of the leg from stowed toward operable condition so that it cannot move past its operable condition. A second part 80 of the skirt 76 extends around a second opposite side of leg 68 to tend to releasably retain the leg in either the operable or the stowed condition. This skirt second part 80 includes a cam 82 having a first camming surface 84 extending from substantially tangent relation to the leg 68 in the plane of leg movement about its pivot pin support axis 75 when the leg is in its operable condition to a high point forcing the leg to move away from its operable condition. In the form of the invention as shown, this can move the pivot pin 70 on the pivot pin axis about one-half the diameter of the leg 68.

The cam 82 of the pivot bracket skirt second part 80 also includes a second camming surface 86 which extends from the high point of the first camming surface into tangent relation to the leg 68 when in the stowed condition in the plane of leg movement about the pivot pin support axis 75.

Each pivot pin is long enough so that its longitudinal movement along the pivot pin axis 75 during camming is insufficient to remove it from engagement with its pivot pin support opening 74 in its associated pivot bracket.

The shape of the first camming surface 84 of the skirt bracket second part 80 is so formed as to tend to maintain the leg 68 in contact with the first skirt part 78 when the support means is in its operable condition and the initial angle of this first camming surface 84 is such as to require over twice the torque to be applied to each support means to break it away from its operable condition to begin ramping action toward its stowed condition than the torque that is supplied by gravity to a support means in operable condition and extending outwardly and upwardly from the top brackets when the portable grill frame members lie in a vertical plane.

The second camming surface 86 is shaped to tend to maintain leg 68 in contact with parts associated with the rectangular main frame 12 of the portable grill 10 when that support means is in its stowed condition. The initial angle of contact of the second camming surface 86 is such as to require more torque to be applied to each support means to move it from the stowed position to begin ramping action toward operable condition than the torque that is supplied by gravity to a support means in a stowed condition when the portable grill frame members are supported in a horizontal plane.

Fuel pans 16 and 17 also include fuel pan alignment stops 34. As best seen in FIG. 1, each alignment stop 34 is formed by an outward projection of the sheet metal forming side wall 27 of the fuel pan 16,17. Stops 34 can therefore be easily and inexpensively manufactured. Stops 34 are positioned so that when its fuel pan is in a position at right angles to an upper straight horizontal edge portion 88 of each side plate 22, the stop is supported on this edge portion 88 to establish and maintain this vertical position.

Although the present invention has been described with reference to preferred embodiments, workers skilled in the art will recognize that changes may be made in form and detail without departing from the spirit and scope of the invention.

What is claimed is:
1. In a portable grill including:
(i) a generally rectangular main frame partially defined by a pair of parallel, spaced apart, elongate frame end members and a pair of parallel, spaced apart, elongate frame side members,
(ii) a pair of generally U-shape frame support means, each open end of each such support means being pivotally mounted with respect to a different one of one of the pairs of mutually parallel frame members, the support means pivot axis at each open end of each support means being coincident to the support means pivot axis of its other open end, and such pivot axis of each support means being parallel to and spaced from the pivot axis of the other support means, each support means being movable between an operable condition wherein it is in a position to support the rectangular frame and a stowed condition where it lies in generally parallel relation to the frame end members and side members,
(iii) at least one generally rectangular, open top fuel pan having a bottom wall, a pair of mutually parallel side walls and mutually parallel first and second end walls, the side walls and end walls connecting to each other and extending integrally upwardly from the bottom wall, said pan being adjustably mounted with respect to the main frame to be movable and pivotable about a fuel pan pivot axis adjacent the first pan end wall and parallel to the longitudinal axis of the frame end members between a generally horizontal position and a generally upright position, and
(iv) a grate attachable to the fuel pan to cover a substantial portion of the open top of the fuel pan from the first pan end wall toward but short of the sec- ond pan end wall thus to leave a fuel access opening between the grate and the second pan end wall; the improvement wherein:

(a) the fuel pan also includes a lip extending integrally inwardly from at least the side walls and the first end wall, said lip including at least two side wall portions extending from the two side walls and a first end wall portion extending from the first end wall of the fuel pan, said lip lying in a first fuel pan plane defining the upper edges of the pan side walls and first end wall; and (b) the grate includes:

(1) a foraminous, generally rectangular framework of relatively closely spaced apart bars lying generally in a single plane and being of configuration and dimension to fit into the fuel pan to lie in closely adjacent relation to but within the inner edges of the fuel pan lip when the grate is attached to the fuel pan, said grate framework being partially defined by two side edge portions and first and second end edge portions, (2) first and second grate positioning bars extending integrally outwardly from opposed side edge portions of the grate framework and outside the plane of the grate, said positioning bars each being of configuration and dimension to extend over and in contact with both lip side edge wall portions to position the upper surface of the grate framework in said first fuel pan plane when the grate is attached to the pan, (3) first grate retaining means extending integrally outwardly from said first end portion of the grate framework, said first grate retaining means being of configuration and dimension to extend under and in contact with the lip first end wall portion to tend to retain the grate framework in said first fuel pan plane when the grate is attached to the fuel pan, and (4) a grate retaining bar integral with a second end portion of the grate framework and of configuration and dimension to extend under and beyond both lip side wall portions to retain the grate framework in the first fuel pan plane when the grate is attached to the pan and the first retaining means is under and in contact with the lip first end wall portion.

2. The portable grill of claim 1 wherein:

(c) the first and second grate positioning bars are mutually parallel and are parts of a rectangular grate frame which also includes first and second mutually parallel framework holding bars, outer ends of each holding bar being integrally connected to outer ends of each positioning bar;

(d) the grate framework includes a plurality of relatively closely spaced grate framework bars extending in parallel relationship to the grate positioning bars, each framework bar being integrally attached to each gate frame framework holding bar to fixedly position the gate framework bars with respect to each other and to position the gate frame framework holding bars outside of the first fuel pan plane; and (e) the first grate retaining means includes an extension of the grate framework bars beyond the first end portion of the grate framework and its adjacent grate framework holding bar, the extensions of said grate framework bars reaching outwardly and downwardly from the plane of the grate framework to have configuration and dimension such that at least an outermost end portion of such extension lies under and in contact with said lip first end wall portion to tend to retain the grate framework in said first fuel pan plane when the grate is attached to the fuel pan.

3. The portable grill of claim 2 wherein:

(v) each of the two generally U-shape support means includes a ground supported base, two legs integral with the base, each leg extending approximately at right angles from the base in a common plane with the base, and each leg having a pivot pin integral with its free open end and extending from the leg approximately at right angles to the leg, the pivot axis of each pin being coincident with the pivot axis of the pin on its other leg, each of the support means being fabricated to have its pivot pins and that portion of the legs adjacent the pivot pins made of cylindrical rods of uniform diameter, (vi) a support means pivot bracket extends integrally from each of the four corners of the generally rectangular frame of the portable grill, each bracket being provided with a pivot pin support opening therethrough, the axis of the pivot pin support opening in a first adjacent pair of pivot brackets being coincident, and the axis of the pivot pin support openings in a second pair of the pivot brackets being coincident, and (vii) each of the pivot pins is pivotally mounted in the pivot support opening of one of the pivot brackets, and the U-shape support means is resilient and of configuration to tend to continuously urge the pivot pins in direction toward their support brackets;

the further improvement wherein:

(f) each pivot bracket includes a skirt configured to contact and closely encompass a part of its associated leg adjacent the pivot pin when the support means is in its operable condition, a first part of the skirt extending around a first side of the leg to limit movement of the leg from stowed to operable condition to prevent it from going past its operable condition, a second part of the skirt extending around a second opposite side of the leg to tend to releasably retain it in either the operable condition or the stowed condition, said skirt second part including a cam having a first camming surface extending from substantially tangent to the leg in the plane of leg movement about the pivot pin support axis when in its operable condition to a high point forcing the leg to move in direction away from its pivot bracket as the U-shape support means is forced from its operable condition toward its stowed condition.

4. The portable grill of claim 3 wherein:

(g) each pivot pin is long enough so that longitudinal movement on the pivot pin support axis during camming is insufficient to remove it from engagement with the pivot pin support opening in its associate pivot bracket; and (h) the first camming surface of the second part of each pair of bracket skirts of each support means is shaped to tend to maintain the legs of that pair in contact with the first skirt part of that bracket when that support means is in its operable condition and the initial angle of the first camming surface is such as to require more torque to be applied to each support means to begin ramping action toward stowed condition than torque is supplied by gravity to a support means in operable condition and extending outwardly and upwardly from the top brackets when the portable grill frame members lie in a vertical plane.

5. The portable grill of claim 4 wherein:
(i) the pivot bracket skirt second part also includes a second camming surface extending from the high point of the first camming surface to tangent relation to its associated leg in the stowed condition in the plane of leg movement about its pivot pin support axis.

6. The portable grill of claim 5 wherein:
(j) the second camming surface of the second part of the pivot bracket skirt is shaped to tend to maintain its associated leg in contact with parts associated with the rectangular frame of the portable grill when that support means is in its stowed condition and initial angle of said second camming surface is such as to require more torque to be applied to each support means to begin ramping action toward operable condition than torque is supplied by gravity to a support means in stowed condition when the portable grill frame members are supported in a horizontal plane.

7. In a portable grill including:
(i) a generally rectangular main frame partially defined by a pair of parallel, spaced apart, elongate frame end members and a pair of parallel, spaced apart, elongate frame side members,
(ii) at least one generally rectangular open top fuel pan having a bottom wall, a pair of mutually parallel side walls and mutually parallel first and second end walls, the side walls and end walls connecting to each other and extending integrally upwardly from the bottom wall, said pan being adjustably mounted with respect to the main frame to be movable and pivotable about a fuel pan pivot axis adjacent the first pan end wall and parallel to the longitudinal axis of the frame end members between a generally horizontal position and a generally upright position, and
(iii) a grate attachable to the fuel pan to cover a substantial portion of the open top of the fuel pan from the first pan end wall toward but short of the second pan end wall thus to leave a fuel access opening between the grate and the second
the improvement wherein:
(a) the fuel pan also includes a lip extending integrally inwardly from at least the side walls and the first end wall, said lip including at least two side wall portions extending from the two side walls and a first end wall portion extending from the first end wall of the fuel pan, said lip lying in a first fuel pan plane defining the upper edges of the pan side walls and first end wall; and
(b) the grate includes:
 (1) a foraminous, generally rectangular framework of relatively closely spaced apart bars lying generally in a single plane and being of configuration and dimension to fit into the fuel pan to lie in closely adjacent relation to but within the inner edges of the fuel pan lip when the grate is attached to the fuel pan, said grate framework being partially defined by two side edge portions and first and second end edge portions,
 (2) first and second grate positioning bars extending integrally outwardly from opposed side edge portions of the grate framework and outside the plane of the grate, said positioning bars each being of configuration and dimension to extend over and in contact with both lip side edge wall portions to position the upper surface of the grate framework in said first fuel pan plane when the grate is attached to the pan,
 (3) first grate retaining means extending integrally outwardly from said first end portion of the grate framework, said first grate retaining means being of configuration and dimension to extend under and in contact with the lip first end wall portion to tend to retain the grate framework in said first fuel pan plane when the grate is attached to the fuel pan, and
 (4) a grate retaining bar integral with a second end portion of the grate framework and of configuration and dimension to extend under and beyond both lip side wall portions to retain the grate framework in the first fuel pan plane when the grate is attached to the pan and the first retaining means is under and in contact with the lip first end wall portion.

8. The portable grill of claim 7 wherein:
(c) the first and second grate positioning bars are mutually parallel and are parts of a rectangular grate frame which also includes first and second mutually parallel framework holding bars, outer ends of each holding bar being integrally connected to outer ends of each positioning bar;
(d) the grate framework includes a plurality of relatively closely spaced grate framework bars extending in parallel relationship to the grate positioning bars, each framework bar being integrally attached to each grate frame framework holding bar to fixedly position the gate framework bars with respect to each other and to position the grate frame framework holding bars outside of the first plane; and
(e) the first grate retaining means includes an extension of the grate framework bars beyond the first end portion of the grate framework and its adjacent grate framework bar, the extensions of said grate framework bars reaching outwardly and downwardly from the plane of the grate framework to have configuration and dimension such that at least an outermost end portion of such extension lies under and in contact with said lip first end wall portion to tend to retain the grate framework in said first plane when the grate is attached to the fuel pan.

9. A portable grill, including:
a generally rectangular fuel pan having a bottom wall, a pair of side walls, first and second end walls, and lips having upper and lower surfaces extending inward from the side walls and first end wall; and
a grate removably mounted to the fuel pan and including:
a grate framework having first and second end edge portions and first and second side edge portions;
grate positioning means extending outward from the first and second side edge portions of the framework over and in contact with the upper surfaces of the lips on the side walls of the fuel pan;

first grate retaining means extending outward from the first end edge portion of the framework under and in contact with the lower surface of the lip on the first end wall of the fuel pan; and second grate retaining means extending outward from the first and second side edge portions of the framework under and in contact with the lower surfaces of the lips of the corresponding side walls of the fuel pan.

10. The portable grill of claim 9 wherein the grate framework is formed by a plurality of spaced apart bars lying in a framework plane.

11. The portable grill of claim 10 wherein the grate positioning means includes first and second positioning bars extending generally parallel to and outward from the side edge portions of the framework and above the framework plane.

12. The portable grill of claim 10 wherein the grate retaining means includes a first grate retaining bar generally parallel to and extending outward from the first end edge portion of the framework and below the framework plane.

13. The portable grill of claim 10. wherein the grate retaining means includes a second grate retaining bar adjacent and generally parallel to the second end edge portion of the framework.

14. The portable grill of claim 10 wherein the second camming surface of the second part of the pivot bracket skirt is shaped to maintain its associated leg in its stowed condition.

* * * * *

UNITED STATES PATENT AND TRADEMARK OFFICE
CERTIFICATE OF CORRECTION

PATENT NO. : 4,884,499

DATED : December 5, 1989

INVENTOR(S) : Eugene F. Rensch

It is certified that error appears in the above-identified patent and that said Letters Patent is hereby corrected as shown below:

Column 9, line 34, following "rectangular" insert --,--.

Column 9, line 50, following "the second" insert --pan end wall;--.

Column 12, line 4, following "wherein the" insert --first--.

Column 12, line 9, following "wherein the" insert --second--.

Column 12, delete claim 14 (lines 13-16) and insert the following:

Signed and Sealed this

Sixteenth Day of April, 1991

*Attest:*

HARRY F. MANBECK, JR.

*Attesting Officer*     *Commissioner of Patents and Trademarks*